(12) United States Patent
Sato et al.

(10) Patent No.: US 8,465,830 B2
(45) Date of Patent: Jun. 18, 2013

(54) CERAMIC ELECTRONIC COMPONENT

(75) Inventors: Koji Sato, Nagaokakyo (JP); Yukio Sanada, Nagaokakyo (JP); Kosuke Onishi, Nagaokakyo (JP); Yasuhiro Nishisaka, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/118,629

(22) Filed: May 31, 2011

(65) Prior Publication Data

US 2011/0293894 A1      Dec. 1, 2011

(30) Foreign Application Priority Data

Jun. 1, 2010   (JP) .................. 2010-125966

(51) Int. Cl.
*B32B 3/00*           (2006.01)

(52) U.S. Cl.
USPC ......................................... 428/189; 428/210

(58) Field of Classification Search
USPC .................. 428/189, 210; 361/311, 312, 313, 361/320, 321.1, 321.2, 321.3, 321.4, 321.5, 361/306.3, 303, 304, 305
See application file for complete search history.

(56) References Cited

U.S. PATENT DOCUMENTS

| 6,377,439 | B1 | 4/2002 | Sekidou et al. |
| 7,324,325 | B2 * | 1/2008 | Kojima et al. ................. 361/311 |
| 2007/0139861 | A1 * | 6/2007 | Nakano et al. ................. 361/311 |

FOREIGN PATENT DOCUMENTS

| JP | 06-163311 A | | 6/1994 |
| JP | 08-195304 A | | 7/1996 |
| JP | 08195304 A | * | 7/1996 |
| JP | 2001-035738 A | | 2/2001 |
| JP | 2008-091400 A | | 4/2008 |

* cited by examiner

*Primary Examiner* — Catherine A Simone
(74) *Attorney, Agent, or Firm* — Keating & Bennett, LLP

(57) ABSTRACT

A ceramic electronic component includes a ceramic body having a substantially rectangular parallelpiped shape. The ceramic body includes a central portion in which first and second internal electrodes are arranged, and first and second end portions in which the first and second internal electrodes are not arranged. The ceramic electronic component satisfies Expressions (1) and (2) below:

$$W1 > T \qquad (1)$$

$$W2 > T \qquad (2)$$

where T denotes the dimension of the ceramic body in a thickness direction, W1 denotes the dimension of the first end portion in a width direction, and W2 denotes the dimension of the second end portion in the width direction.

4 Claims, 9 Drawing Sheets

CERAMIC ELECTRONIC COMPONENT

BACKGROUND OF THE INVENTION

1. Field of the Invention

The present invention relates to a ceramic electronic component.

2. Description of the Related Art

As electronic apparatuses, such as mobile phones and portable music players, have become smaller in recent years, ceramic electronic components included in such electronic apparatuses have rapidly become thinner and smaller. Accordingly, various types of thin and small ceramic electronic components are being developed.

With the reductions in the thicknesses and sizes of ceramic electronic components, the strengths of ceramic electronic components have decreased correspondingly. Therefore, thin and small ceramic electronic components may crack when mounted on circuit boards or during use.

For example, Japanese Unexamined Patent Application Publication No. 6-163311 discloses a monolithic ceramic capacitor including a substantially rectangular parallelpiped ceramic body and first and second external electrodes provided at two respective ends of the ceramic body. In this monolithic ceramic capacitor, cracks tend to occur at the two ends of the ceramic body at which the external electrodes are provided. Such a crack tends to extend from a principal surface and in the thickness direction. Japanese Unexamined Patent Application Publication No. 6-163311 also discloses a technique of preventing the occurrence of a short circuit between first and second internal electrodes provided in the ceramic body that may occur if water or other fluids enter such a crack.

As described above, ceramic electronic components are becoming thinner and smaller. In particular, thin ceramic electronic components that are configured to be embedded into circuit boards are highly desirable. Thus, the inventors of the present invention performed experiments for further reducing the thickness of ceramic electronic components. Consequently, the inventors of the present invention have found that, even if the technique disclosed in Japanese Unexamined Patent Application Publication No. 6-163311 is applied to thin ceramic electronic components, there are some cases in which a short circuit between the internal electrodes cannot be sufficiently prevented.

SUMMARY OF THE INVENTION

To overcome the problems described above, preferred embodiments of the present invention provide a ceramic electronic component preferably including a ceramic body and first and second internal electrodes provided in the ceramic body, wherein the first and second internal electrodes are arranged so as not to cause a short circuit therebetween even if the ceramic body has a small thickness.

When a ceramic electronic component including a thin ceramic body having a small thickness is mounted on a circuit board, the impact of mounting may cause cracks. According to a diligent study performed by the inventors of the present invention, it was found that about 80% of such cracks occur from locations near edges of the ceramic body at the tips of external electrodes, which extend in the length direction, toward the inside of the ceramic body. The inventors of the present invention have also found that, when any cracks occur and each of such cracks is projected to a width-thickness (W-T) section of the ceramic body, the angle (entrance angle) between a virtual line projected in the W-T section and a side surface of the ceramic body is less than about 30°. This result led the inventors of the present invention to develop the present invention.

According to a preferred embodiment of the present invention, a ceramic electronic component preferably includes a ceramic body having a substantially rectangular parallelpiped shape, for example, and a first internal electrode and a second internal electrode. The first and second internal electrodes are provided in the ceramic body and each extends in a length direction and a width direction of the ceramic body. The first and second internal electrodes each extend to one of lengthwise end surfaces of the ceramic body. The ceramic body preferably includes a central portion in the approximate center on the ceramic body in the width direction, a first end portion disposed on one side of the central portion in the width direction, and a second end portion disposed on the other side of the central portion in the width direction. The first and second internal electrodes are preferably arranged in the central portion and are not arranged in the first and second end portions. The ceramic electronic component according to a preferred embodiment of the present invention preferably satisfies Expressions (1) and (2) below:

$$W1 > T \tag{1}$$

$$W2 > T \tag{2}$$

where T denotes the dimension of the ceramic body in a thickness direction, W1 denotes the dimension of the first end portion in the width direction, and W2 denotes the dimension of the second end portion in the width direction.

According to another preferred embodiment of the present invention, the first internal electrode and the second internal electrode preferably face each other in the thickness direction.

According to another preferred embodiment of the present invention, the ceramic electronic component preferably further includes a first external electrode and a second external electrode. The first external electrode is provided on the ceramic body. The first external electrode is electrically connected to the first internal electrode. The second external electrode is provided on the ceramic body. The second external electrode is electrically connected to the second internal electrode. The ceramic body includes a first principal surface, a second principal surface, a first side surface, a second side surface, a first end surface, and a second end surface. Each of the first and second principal surfaces extends in the length direction and the width direction. Each of the first and second side surfaces extends in the length direction and the thickness direction. Each of the first and second end surfaces extends in the width direction and the thickness direction. Each of the first external electrode and the second external electrode is preferably substantially provided on the first and second principal surfaces and a corresponding one of the first and second end surfaces among the first and second principal surfaces, the first and second side surfaces, and the first and second end surfaces. With such a configuration, each of the first and second external electrodes is not substantially provided on the first and second side surfaces. Therefore, even if, for example, the temperature of the ceramic electronic component changes and the ceramic electronic component expands or contracts, the stresses to be applied from the first and second external electrodes to the ceramic body are limited to low levels. Thus, the occurrence of any cracks in the ceramic body is effectively prevented.

According to a preferred embodiment of the present invention, the conditions W1>T and W2>T are preferably satisfied. Therefore, even if any cracks occur from locations near edges of the ceramic body at the tips of the external electrodes, which extend in the length direction, toward the inside of the ceramic electronic component because of the impact that occurs during mounting of the ceramic electronic component onto a circuit board, the cracks do not extend to the central portion including the first and second internal electrodes. Thus, the first and second internal electrodes are prevented from short-circuiting therebetween.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

First Preferred Embodiment

A first preferred embodiment of the present invention will be described with reference to a ceramic electronic component 1 illustrated in FIG. 1 as an example. The ceramic electronic component 1 is only exemplary. Preferred embodiments of the present invention are not limited in any way to the ceramic electronic component 1 and a method of manufacturing the ceramic electronic component 1 described below.

Figure 1:
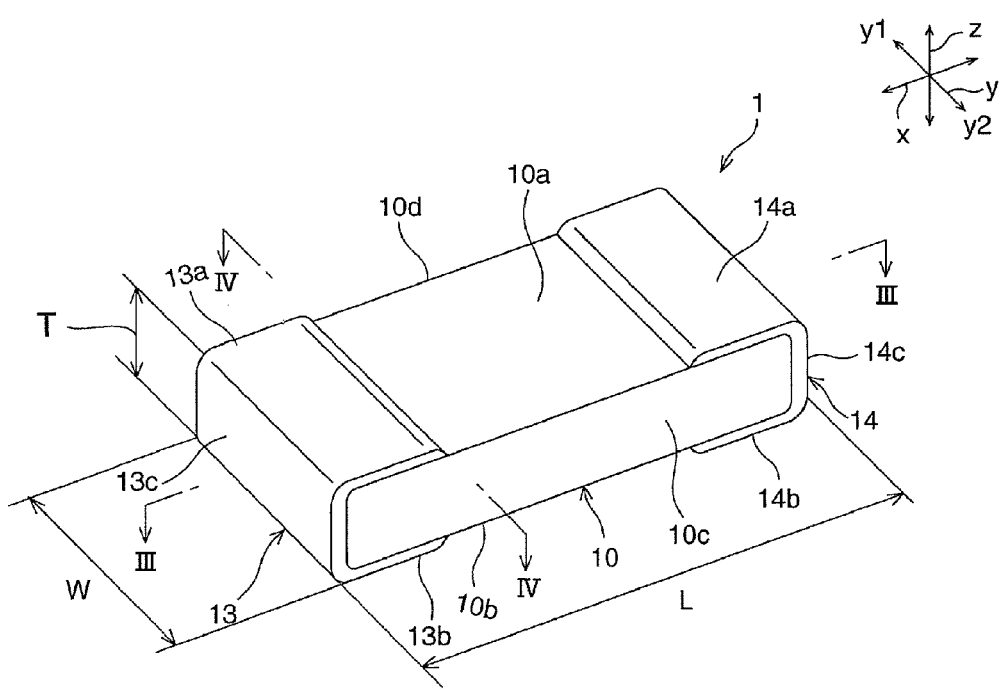
FIG. 1 is a schematic perspective view of a ceramic electronic component according to a first preferred embodiment of the present invention.
Figure 2:
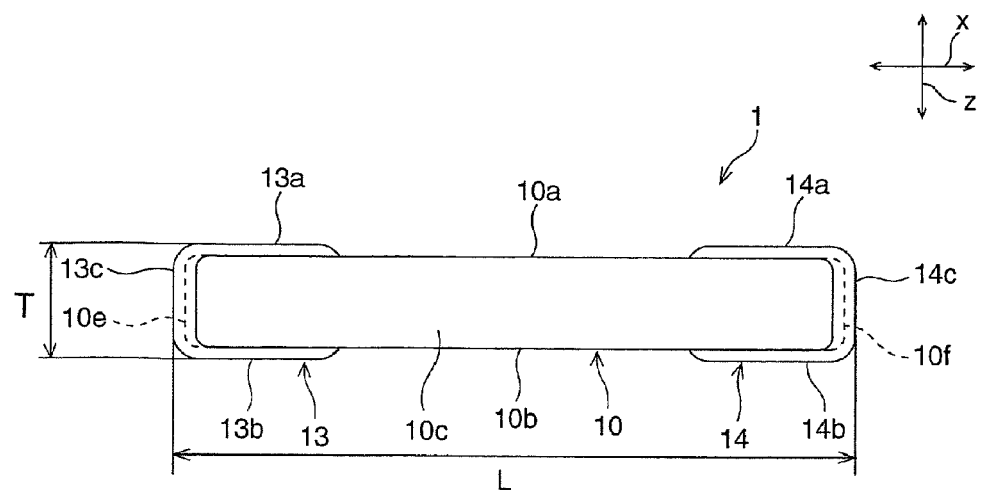
FIG. 2 is a schematic side view of the ceramic electronic component according to the first preferred embodiment of the present invention.
Figure 3:
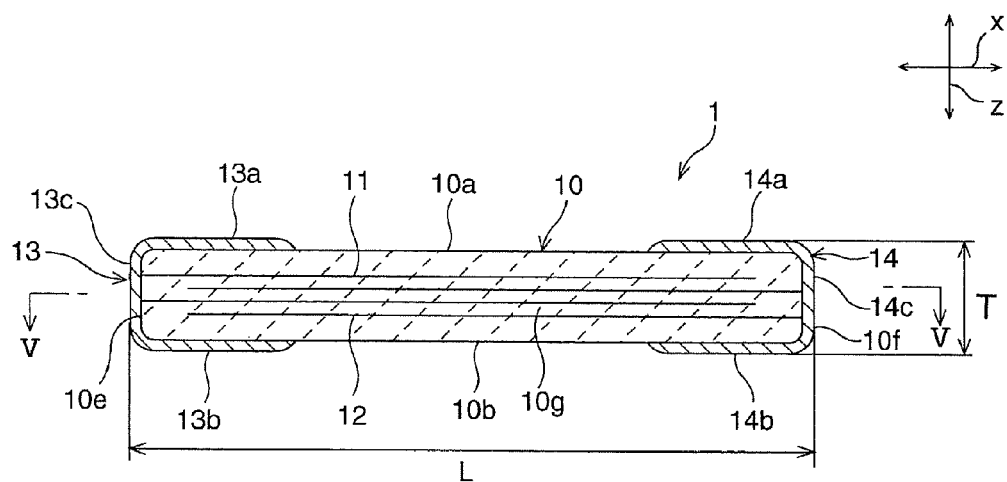
FIG. 3 is a schematic sectional view of the ceramic electronic component taken along line III-III of FIG. 1.
Figure 4:
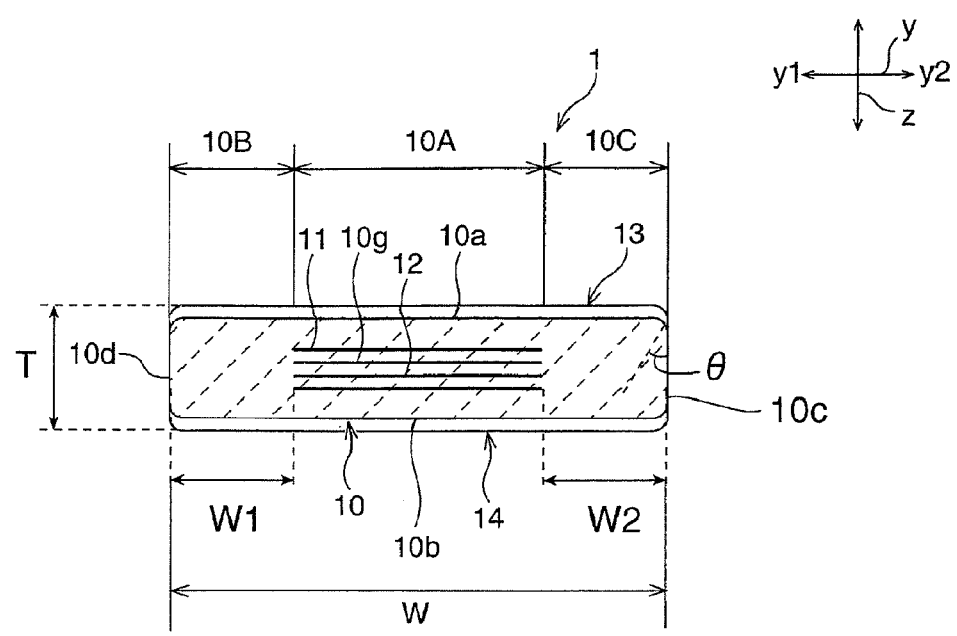
FIG. 4 is a schematic sectional view of the ceramic electronic component taken along line IV-IV of FIG. 1.
Figure 5:
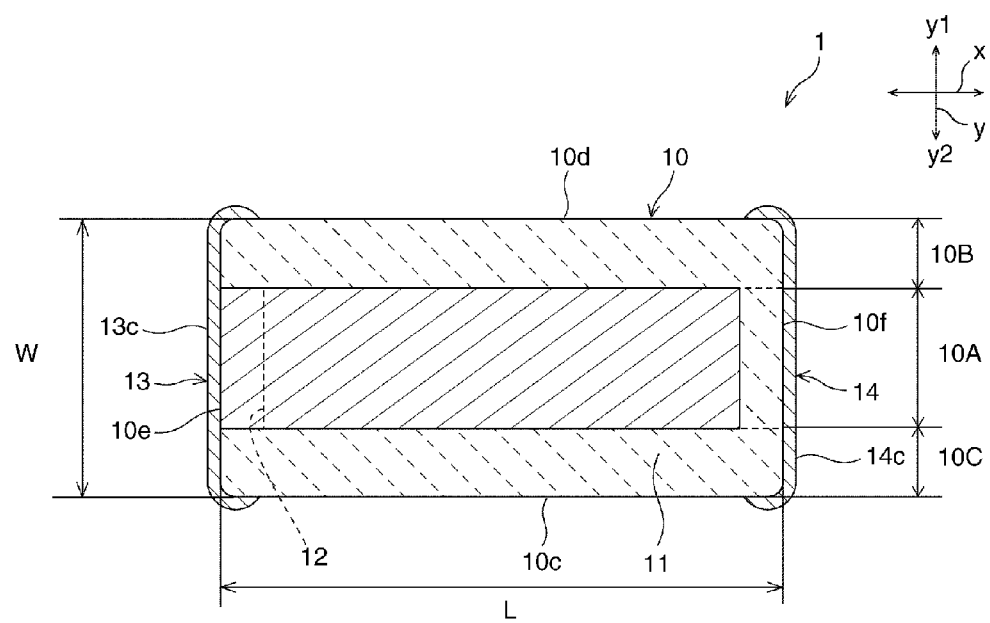
FIG. 5 is a schematic sectional view of the ceramic electronic component taken along line V-V of FIG. 3.

FIG. 1 is a schematic perspective view of the ceramic electronic component 1 according to a first preferred embodiment of the present invention. FIG. 2 is a schematic side view of the ceramic electronic component 1 according to the first preferred embodiment. FIG. 3 is a schematic sectional view of the ceramic electronic component 1 taken along line III-III of FIG. 1. FIG. 4 is a schematic sectional view of the ceramic electronic component 1 taken along line IV-IV of FIG. 1. FIG. 5 is a schematic sectional view of the ceramic electronic component 1 taken along line V-V of FIG. 3.

Referring to FIGS. 1 to 5, the configuration of the ceramic electronic component 1 will be described first.

As illustrated in FIGS. 1 to 5, the ceramic electronic component 1 preferably includes a ceramic body 10. The ceramic body 10 is preferably made of a ceramic material suitable for the function of the ceramic electronic component 1. Specifically, if the ceramic electronic component 1 is a capacitor, the ceramic body 10 may preferably be made of a dielectric ceramic material. Exemplary dielectric ceramic materials include $BaTiO_3$, $CaTiO_3$, $SrTiO_3$, $CaZrO_3$, and other suitable dielectric ceramic materials. Considering the desired characteristics of the ceramic electronic component 1, the ceramic body 10 may be made of any of the above ceramic materials as a primary ingredient with a secondary ingredient such as a Mn compound, Mg compound, Si compound, Fe compound, Cr compound, Co compound, Ni compound, or rare-earth compound, for example, added thereto according to need.

If the ceramic electronic component 1 is a ceramic piezoelectric device, the ceramic body 10 may preferably be made of a piezoelectric ceramic material. Exemplary piezoelectric ceramic materials include a lead-zirconate-titanate (PZT)-based ceramic material and other suitable piezoelectric ceramic materials.

If the ceramic electronic component 1 is a thermistor device, the ceramic body 10 may preferably be made of a semiconductor ceramic material. Exemplary semiconductor ceramic materials include a spinel-based ceramic material and other suitable semiconductor ceramic materials.

If the ceramic electronic component 1 is an inductor device, the ceramic body 10 may preferably be made of a magnetic ceramic material. Exemplary magnetic ceramic materials include a ferrite ceramic material and other suitable magnetic ceramic materials.

The ceramic body 10 preferably has a substantially rectangular parallelpiped shape. As illustrated in FIGS. 1 to 4, the ceramic body 10 includes a first principal surface 10a and a second principal surface 10b each extending in a length direction x and a width direction y. As illustrated in FIGS. 1, 2, 4, and 5, the ceramic body 10 also includes a first side surface 10c and a second side surface 10d each extending in a thickness direction z and the length direction x. As illustrated in FIGS. 2, 3, and 5, the ceramic body 10 also includes a first end surface 10e and a second end surface 10f each extending in the thickness direction z and the width direction y.

In this specification, the term "substantially rectangular parallelpiped" includes a rectangular parallelpiped in which the corners defined by a first principal surface, a second principal surface, a first side surface, a second side surface, a first end surface, and a second end surface, and the edges defined by the first principal surface, the second principal surface, the first side surface, and the second side surface are chamfered or round chamfered. That is, a "substantially rectangular parallelpiped" member refers to any member having a first principal surface, a second principal surface, a first side surface, a second side surface, a first end surface, and a second end surface. Moreover, a portion or the entirety of the principal, side, and end surfaces may include projections and/or recesses.

In the first preferred embodiment, denoting the thickness, length, and width of the ceramic body 10 as T, L, and W, respectively, the ceramic body 10 is preferably, but is not limited to, a thin body that satisfies $T \leq W < L$, $1/5 W \leq T \leq 1/2 W$, and $T \leq$ about 0.3 mm, for example. Specifically, the thickness, length, and width of the ceramic body 10 are preferably as follows: about 0.1 mm $\leq T \leq$ about 0.4 mm, about 0.4 mm $\leq L \leq$ about 1 mm, and about 0.2 mm $\leq W \leq$ about 0.5 mm, for example, where L denotes the length of the ceramic body 10, W denotes the width of the ceramic body 10, and T denotes the thickness of the ceramic body 10.

As illustrated in FIGS. 3 to 5, the ceramic body 10 preferably includes a plurality of first internal electrodes 11 and a plurality of second internal electrodes 12 each having a substantially rectangular shape. The first internal electrodes 11 and the second internal electrodes 12 are alternately provided at regular intervals in the thickness direction z. The first and second internal electrodes 11 and 12 preferably extend parallel or substantially parallel to the first and second principal surfaces 10a and 10b. The first internal electrodes 11 and the second internal electrodes 12 are preferably arranged to face one another with ceramic layers 10g interposed therebetween in the thickness direction z.

The thicknesses of the ceramic layers 10g may preferably be, but are not limited to, about 0.5 µm to about 10 µm, for example. The thicknesses of the first and second internal electrodes 11 and 12 may preferably be, but are not limited to, about 0.3 µm to about 2 µm, for example.

Each of the first and second internal electrodes 11 and 12 may be made of any suitable conductive material, for example, a metal such as Ni, Cu, Ag, Pd, or Au; or an alloy of one or more of the foregoing metals, such as an Ag—Pd alloy.

As illustrated in FIGS. 4 and 5, the first and second internal electrodes 11 and 12 do not extend over the entire the ceramic body 10 in the width direction y. In the width direction y, the first and second internal electrodes 11 and 12 are arranged in a central portion of the ceramic body 10 and are not arranged in portions at the ends of the ceramic body 10. That is, the ceramic body 10 includes a central portion 10A defined in the approximate center thereof in the width direction y and including the first and second internal electrodes 11 and 12, a first end portion 10B defined on one side y1 thereof in the width direction y with respect to the central portion 10A and not including the first and second internal electrodes 11 and 12, and a second end portion 10C defined on the other side y2 thereof in the width direction y with respect to the central portion 10A and not including the first and second internal electrodes 11 and 12.

Here, denoting the width of the first end portion 10B be W1 and the width of the second end portion 10C be W2, the ceramic electronic component 1 according to the first preferred embodiment preferably satisfies Expressions (1) and (2) below:

$$W1 > T \quad (1)$$

$$W2 > T \quad (2)$$

As illustrated in FIGS. 1 to 5, a first external electrode 13 and a second external electrode 14 are provided on the ceramic body 10. The first external electrode 13 is electrically connected to the first internal electrodes 11. The second external electrode 14 is electrically connected to the second internal electrodes 12. The tips of the first internal electrodes 11 that are not connected to the first external electrode 13 are preferably located between a first portion 14a and a second portion 14b of the second external electrode 14 in the T-direction in FIG. 3. The tips of the second internal electrodes 12 that are not connected to the second external electrode 14 are preferably located between a first portion 13a and a second portion 13b of the first external electrode 13 in the T-direction in FIG. 3.

The first external electrode 13 is preferably substantially provided on the first and second principal surfaces 10a and 10b and the first end surface 10e among the first and second principal surfaces 10a and 10b, the first and second side surfaces 10c and 10d, and the first and second end surfaces 10e and 10f. Specifically, the first external electrode 13 preferably includes the first portion 13a provided on the first principal surface 10a, the second portion 13b provided on the second principal surface 10b, and a third portion 13c provided on the first end surface 10e. In the first preferred embodiment, the first external electrode 13 is preferably not substantially provided on the first and second side surfaces 10c and 10d.

The second external electrode 14 is preferably substantially provided on the first and second principal surfaces 10a and 10b and the second end surface 10f among the first and second principal surfaces 10a and 10b, the first and second side surfaces 10c and 10d, and the first and second end surfaces 10e and 10f. Specifically, the second external electrode 14 preferably includes the first portion 14a provided on the first principal surface 10a, the second portion 14b provided on the second principal surface 10b, and a third portion 14c provided on the second end surface 10f. In the first preferred embodiment, the second external electrode 14 is preferably not substantially provided on the first and second side surfaces 10c and 10d.

Thus, in the first preferred embodiment, each of the first external electrode 13 and the second external electrode 14 is preferably not substantially provided on the first and second side surfaces 10c and 10d. Therefore, the size of the ceramic electronic component 1 is effectively reduced.

Each of the first and second external electrodes 13 and 14 may preferably be made of, but are not limited to, a metal such as Cu, Ni, Ag, Pd, or Au; or an alloy of one or more of the foregoing metals, such as a Ag—Pd alloy, for example. Moreover, each of the first and second external electrodes 13 and 14 may preferably include a plurality of conductive layers made of any of the above metals and alloys. For example, the first and second external electrodes 13 and 14 may preferably include an underlayer formed on the ceramic body 10 by co-firing or post-firing and one or a plurality of plated layers formed on the underlayer. Furthermore, a resin layer arranged to reduce stress may preferably be interposed between the underlayer and the plated layers. The thicknesses of the plated layers may preferably be about 1 µm to about 10 µm, for example.

The thicknesses of the first and second external electrodes 13 and 14 may preferably be, but are not limited to, about 10 µm to about 50 µm, for example.

An exemplary method of manufacturing ceramic electronic components 1 according to the first preferred embodiment will now be described.

Figure 6:
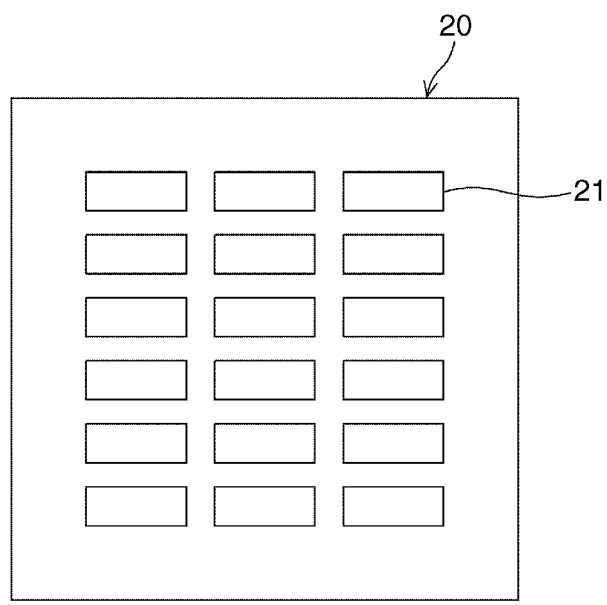
FIG. 6 is a schematic plan view of a ceramic green sheet on which a conductive pattern is provided.

First, a plurality of ceramic green sheets 20 (see FIG. 6) that include a ceramic material and are to form ceramic bodies are prepared. Subsequently, as illustrated in FIG. 6, conductive paste is applied to some of the ceramic green sheets such that conductive patterns 21 that are to form the respective first and second internal electrodes 11 and 12 are formed. The application of the conductive paste may preferably be performed by any of various printing methods, such as screen printing, for example. The conductive paste may preferably include a publicly known binder or solution in addition to conductive particles.

Figure 7:
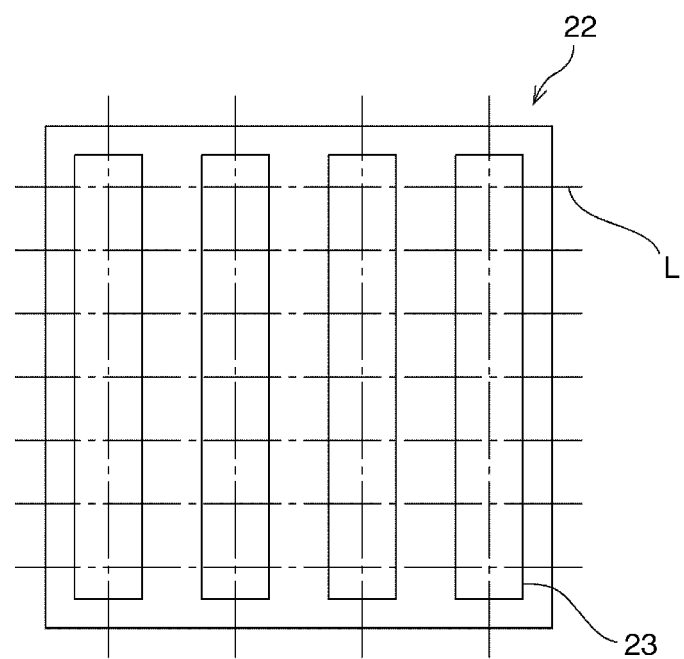
FIG. 7 is a schematic plan view of a mother stack.

Subsequently, some of the ceramic green sheets 20 that do not include any conductive patterns 21, the ceramic green sheets 20 including the conductive patterns 21 that are to form the respective first and second internal electrodes 11 and 12, and the other ceramic green sheets 20 that do not include any conductive patterns 21 are preferably stacked in that order. The resulting body is hydrostatically pressed in the direction of the stacking, whereby a mother stack 22 illustrated in FIG. 7 is obtained.

Subsequently, a conductive pattern 23 that is to form the underlayers of the respective first and second external electrodes 13 and 14 is preferably formed on the mother stack 22 by any printing method, such as screen printing, for example.

Subsequently, the mother stack 22 is cut along cutting lines L, whereby a plurality of raw ceramic stacks are obtained from the mother stack 22. The cutting of the mother stack 22 may be performed by dicing or shearing, for example.

After obtaining the raw ceramic stacks, barrel polishing or other suitable processing may preferably be performed on the raw ceramic stacks such that the corners and edges thereof are chamfered or round chamfered and such that the surfaces thereof are polished.

Subsequently, conductive paste that is to form the underlayers of the respective first and second external electrodes 13 and 14 is applied to two end surfaces of each of the raw ceramic stacks. The application of the conductive paste may preferably be performed by dipping, screen printing, or other suitable method, for example.

Subsequently, the raw ceramic stacks are fired. In the firing process, the first and second internal electrodes 11 and the underlayers of the first and second external electrodes 13 and 14 are simultaneously fired (co-fired). The firing temperature may be set suitably in accordance with the types of the ceramic material and the conductive paste used. The firing temperature may preferably be, for example, about 900° C. to about 1300° C., for example.

Subsequently, plating is preferably performed on the underlayers, whereby the first and second external electrodes 13 and 14 each including an underlayer and a plated layer are obtained. Thus, finished ceramic electronic components 1 are obtained.

In a thin ceramic electronic component, such as the ceramic electronic component 1 according to the first preferred embodiment that preferably satisfies the conditions of W1>T and W2>T, the ceramic body tends to crack because of the impact applied when the ceramic electronic component is mounted on a circuit board. Such cracks tend to occur from locations near edges of the ceramic body at the tips of the external electrodes extending in the length direction x. According to a diligent study performed by the inventors of the present invention, it has been discovered that, when such a crack is projected to a width-thickness (W-T) section of the ceramic body, an angle θ between a virtual line projected in the W-T section and either of the side surfaces is about 30° or less.

In the first preferred embodiment, the conditions W1>T and W2>T are preferably satisfied. Therefore, even if cracks occur with entrance angles less than about 30° from locations near edges of the ceramic body 10 at the tips of the first and second external electrodes 13 and 14, the cracks are prevented from extending to the first and second internal electrodes 11 and 12. Thus, despite the reduced thickness of the ceramic electronic component 1, the first and second internal electrodes 11 and 12 of the ceramic electronic component 1 are effectively prevented from short-circuiting therebetween.

In the first preferred embodiment, each of the first and second external electrodes 13 and 14 are preferably not substantially provided on the first and second side surfaces 10c and 10d. Therefore, even if, for example, the temperature of the ceramic electronic component 1 changes and the ceramic electronic component 1 expands or contracts, the stresses to be applied from the first and second external electrodes 13 and 14 to the ceramic body 10 are minimized. Thus, the occurrence of cracks in the ceramic body 10 is effectively prevented.

Other preferred embodiments of the present invention will now be described. In the following description, elements and components having substantially the same functions as those in the first preferred embodiment are denoted by the same reference numerals as those in the first preferred embodiment, and descriptions thereof are omitted.

Second Preferred Embodiment

Figure 8:
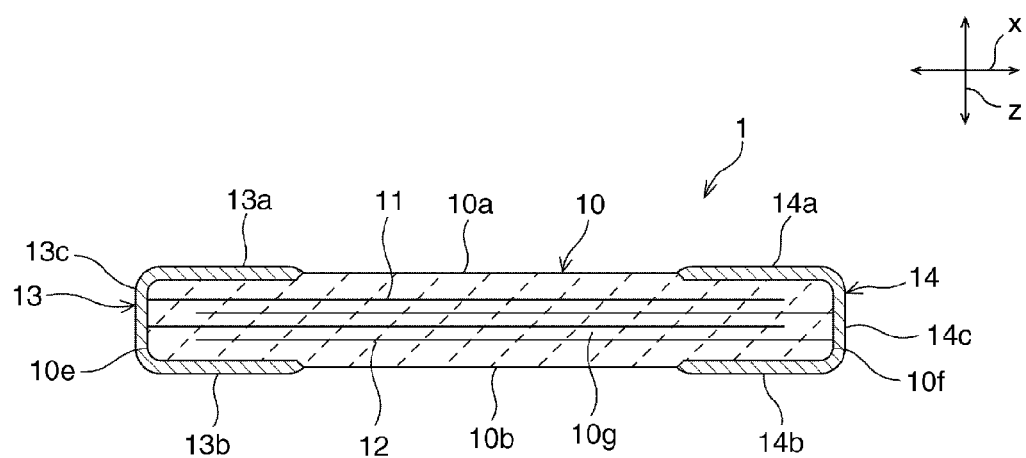
FIG. 8 is a schematic sectional view of a ceramic electronic component according to a second preferred embodiment of the present invention.

FIG. 8 is a schematic sectional view of a ceramic electronic component 1 according to a second preferred embodiment of the present invention.

In the first preferred embodiment, portions of the first and second principal surfaces 10a and 10b that are each covered with either of the first and second external electrodes 13 and 14 and portions of the first and second principal surfaces 10a and 10b that are each covered with neither of the first and second external electrodes 13 and 14 are preferably flush with each other. Preferred embodiments of the present invention are not limited to such a configuration. The portions of the first and second principal surfaces 10a and 10b that are each covered with either of the first and second external electrodes 13 and 14 and the portions of the first and second principal surfaces 10a and 10b that are each covered with neither of the first and second external electrodes 13 and 14 may not necessarily be flush with each other.

For example, as illustrated in FIG. 8, the portions of the first and second principal surfaces 10a and 10b that are each covered with either of the first and second external electrodes 13 and 14 may preferably be disposed inwardly in the thickness direction z with respect to the portions of the first and second principal surfaces 10a and 10b that are each covered with neither of the first and second external electrodes 13 and 14. In such a case, the thickness of the ceramic electronic component 1 is further reduced.

Third Preferred Embodiment

Figure 9:
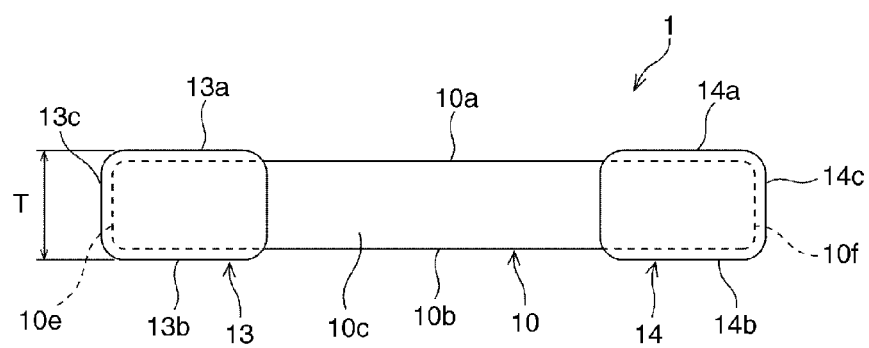
FIG. 9 is a schematic side view of a ceramic electronic component according to a third preferred embodiment of the present invention.

FIG. 9 is a schematic side view of a ceramic electronic component 1 according to a third preferred embodiment of the present invention.

In the first preferred embodiment, the first and second external electrodes 13 and 14 are not substantially provided on the first and second side surfaces 10c and 10d. Alternatively, as illustrated in FIG. 9, the first and second external electrodes 13 and 14 may preferably also be provided on the first and second side surfaces 10c and 10d.

In such a configuration, the reliability of the connection between the ceramic electronic component 1 and a circuit board to be established when the ceramic electronic component 1 is mounted on the circuit board is improved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
    a ceramic body; and
    a first internal electrode and a second internal electrode provided in the ceramic body and each arranged in a length direction and a width direction of the ceramic body so as to extend to lengthwise end surfaces of the ceramic body; wherein
    the ceramic body includes a central portion in an approximate center of the ceramic body in the width direction in which the first and second internal electrodes are arranged, a first end portion disposed on one side of the central portion in the width direction in which the first and second internal electrodes are not arranged, and a second end portion disposed on the other side of the central portion in the width direction in which the first and second internal electrodes are not arranged; and the ceramic electronic component satisfies Expressions (1) and (2) below:

$$W1 > T \quad (1)$$

$$W2 > T \quad (2)$$

where T denotes an overall dimension of the ceramic body in a thickness direction from an uppermost surface to a lowermost surface of the ceramic body, W1 denotes a dimension of the first end portion in the width direction, and W2 denotes a dimension of the second end portion in the width direction.

2. The ceramic electronic component according to claim 1, wherein the first internal electrode and the second internal electrode face each other in the thickness direction of the ceramic body.

3. The ceramic electronic component according to claim 1, further comprising:

a first external electrode provided on the ceramic body and electrically connected to the first internal electrode; and a second external electrode provided on the ceramic body and electrically connected to the second internal electrode; wherein the ceramic body includes a first principal surface and a second principal surface each extending in the length direction and the width direction, a first side surface and a second side surface each extending in the length direction and the thickness direction, and a first end surface and a second end surface each extending in the width direction and the thickness direction; and the first external electrode and the second external electrode are each substantially provided on the first and second principal surfaces and a corresponding one of the first and second end surfaces among the first and second principal surfaces, the first and second side surfaces, and the first and second end surfaces.

4. The ceramic electronic component according to claim 1, wherein the ceramic body has a substantially rectangular parallelpiped shape.

* * * * *